US007809925B2

United States Patent
Mejdrich et al.

(10) Patent No.: US 7,809,925 B2
(45) Date of Patent: Oct. 5, 2010

(54) PROCESSING UNIT INCORPORATING VECTORIZABLE EXECUTION UNIT

(75) Inventors: Eric Oliver Mejdrich, Rochester, MN (US); Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 11/952,193

(22) Filed: Dec. 7, 2007

(65) Prior Publication Data

US 2009/0150647 A1    Jun. 11, 2009

(51) Int. Cl.
  *G06F 15/80*  (2006.01)
(52) U.S. Cl. ............................................. 712/7; 712/20
(58) Field of Classification Search ........................ None
  See application file for complete search history.

(56) References Cited

U.S. PATENT DOCUMENTS

| | | | |
|---|---|---|---|
| 6,272,616 B1 * | 8/2001 | Fernando et al. ............... | 712/20 |
| 6,643,763 B1 * | 11/2003 | Starke et al. ................... | 712/11 |
| 6,944,744 B2 * | 9/2005 | Ahmed et al. .................. | 712/20 |
| 7,383,427 B2 * | 6/2008 | Yamazaki ....................... | 712/220 |
| 7,493,475 B2 * | 2/2009 | Colavin ........................ | 712/214 |
| 7,634,637 B1 * | 12/2009 | Lindholm et al. .............. | 712/22 |
| 2001/0032303 A1 * | 10/2001 | Pechanek et al. .............. | 712/20 |
| 2003/0204819 A1 * | 10/2003 | Matsumoto et al. ............ | 716/1 |
| 2005/0125647 A1 * | 6/2005 | Symes et al. .................. | 712/300 |
| 2005/0251649 A1 * | 11/2005 | Yamazaki ....................... | 712/20 |

OTHER PUBLICATIONS

Krashinsky, R. et al., The Vector-Thread Architecture, 2004, IEEE, Proceedings of the 31st Annual Intl. Symposium on Computer Architecture (ISCA'04), 12 pages.*
Quintana, F. et al., Adding a Vector Unit to a Superscalar Processor, 1999, ACM., pp. 1-10.*

* cited by examiner

*Primary Examiner*—Eric Coleman
(74) *Attorney, Agent, or Firm*—Wood Herron & Evans, LLP

(57) ABSTRACT

A vectorizable execution unit is capable of being operated in a plurality of modes, with the processing lanes in the vectorizable execution unit grouped into different combinations of logical execution units in different modes. By doing so, processing lanes can be selectively grouped together to operate as different types of vector execution units and/or scalar execution units, and if desired, dynamically switched during runtime to process various types of instruction streams in a manner that is best suited for each type of instruction stream. As a consequence, a single vectorizable execution unit may be configurable, e.g., via software control, to operate either as a vector execution or a plurality of scalar execution units.

21 Claims, 7 Drawing Sheets

PROCESSING UNIT INCORPORATING VECTORIZABLE EXECUTION UNIT

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multi-threading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A vector execution unit typically includes multiple processing lanes that handle different datapoints in a vector and perform similar operations on all of the datapoints at the same time. For example, for an architecture that relies on quad(4)word vectors, a vector execution unit may include four processing lanes that perform the identical operations on the four words in each vector.

The aforementioned techniques may also be combined, resulting in a multi-threaded vector execution unit architecture that enables multiple threads to issue SIMD instructions to a vector execution unit to process "vectors" of data points at the same time. Typically, a scheduling algorithm is utilized in connection with issue logic to ensure that each thread is able to proceed at a reasonable rate, with the number of bubbles in the execution unit pipeline kept at a minimum.

It has been found, however, that while this configuration is highly desirable for a significant amount of code, there are certain algorithms that benefit greatly from higher scalar (i.e., single datapoint) issue availability. A conventional vector execution unit may be used to perform scalar math; however, only one out of the multiple processing lanes is used, which creates suboptimal performance, and significant underutilization of processing resources.

One such algorithm that benefits from high scalar multi-thread throughput is rasterization. Rasterization is a process in 3D graphics where three dimensional geometry that has been projected onto a screen is "filled in" with pixels of the appropriate color and intensity. Often the task of rasterizing a piece of geometry is parallelized, sometimes by splitting up the task across several units or threads based on the section of screen the pixel resides.

To interpolate various parameters between the vertices of an object, often the barycentric coordinates must be calculated for each pixel. These are generally three scalar values that correspond to how near a pixel is to each vertex. If the object is to be texture mapped, the texture coordinates of the pixel must be calculated by multiplying the barycentric coordinates with their associated vertex texture coordinates for each vertex, and obtaining the sum from those results. These texture coordinates are then used to load the correct pixels from the texture image to be drawn in the correct rasterized image pixel. The algorithm usually does not see a large benefit from using vector floating point instructions over scalar instructions. Often much of the algorithm calculation time is occupied with waiting for the texture image data to come back from the load, or stalling due to a register dependency. Other threads have the capability to continue progress during this stalling, but with a conventional vector execution unit typically only one vector or scalar instruction may enter the execution pipeline per cycle.

Other algorithms in 3D graphics such as a model to world transform algorithms greatly benefit from using vector instructions. Therefore, in a system intended to perform high performance 3D graphics, it would be beneficial to have the capability to process both vector instructions and scalar instructions in a more efficient manner than has heretofore been possible.

SUMMARY OF THE INVENTION

The invention addresses these and other problems associated with the prior art by providing a "vectorizable" execution unit capable of being operated in a plurality of modes, with the processing lanes in the vectorizable execution unit grouped into different combinations of "logical" execution units in different modes. By doing so, processing lanes can be selectively grouped together to operate as different types of vector execution units and/or scalar execution units, and if desired, dynamically switched during runtime to process various types of instruction streams in a manner that is best suited for each type of instruction stream.

As one example, a vectorizable execution unit may be provided with multiple processing lanes that in one mode, are grouped together into the same logical execution unit such that the processing lanes operate collectively as a single vector or SIMD execution unit. The vectorizable execution unit may then be switched to a different mode, e.g., under the control of software, such that the processing lanes operate independently and in parallel with one another as scalar execution units. In addition, due to the independent nature of the processing lanes in the latter mode, multiple instructions may be concurrently processed by the processing lanes, thus increasing overall instruction throughput in this mode. Consequently, the same logic structure may be dynamically configured to perform workloads that are optimally processed using vector operations, as well as workloads that are optimally processed using scalar operations.

Consistent with one aspect of the invention, a vectorizable execution unit is provided with a plurality of processing lanes, with the plurality of processing lanes including at least first and second processing lanes. Control logic is coupled to the vectorizable execution unit and configured to selectively operate the vectorizable execution unit in first and second modes. In the first mode, the control logic is configured to organize the first and second processing lanes into the same logical execution unit such that the first and second processing lanes operate collectively as a vector execution unit, and in the second mode, the control logic is configured to organize the first and second processing lanes into separate logical execution units such that the first and second processing lanes operate independently and in parallel with one another.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a vectorizable execution unit capable of being operated in a plurality of modes, such that the processing lanes in the vectorizable execution unit may be grouped into different combinations of logical execution units in different modes. By doing so, processing lanes can be selectively grouped together to operate as different types of vector execution units and/or scalar execution units, and if desired, dynamically switched during runtime to process various types of instruction streams in a manner that is best suited for each type of instruction stream.

A logical execution unit, in this regard, constitutes one or more physical processing lanes defined in an execution unit, where a physical processing lane typically incorporates execution logic configured to perform one or more data processing operations, in one or more stages, responsive to an instruction provided thereto. A logical execution unit, in addition, typically is capable of receiving up to one instruction (typically a vector or scalar instruction) per cycle, although if the processing lanes incorporated in a logical execution unit are pipelined, multiple instructions may be at different stages of execution in a logical execution unit at any given time. Where a given mode of a vectorizable execution unit organizes the processing lanes into multiple logical execution units, those units are typically capable of being operated independently and in parallel with one another, e.g., with each logical execution unit responsive to a different instruction in any given cycle. However, from the standpoint of all of the processing lanes organized into a given logical execution unit, those processing lanes typically operate collectively as a single execution unit, such that all are responsive to the same instruction in a given cycle.

Hardware and Software Environment

Figure 1:
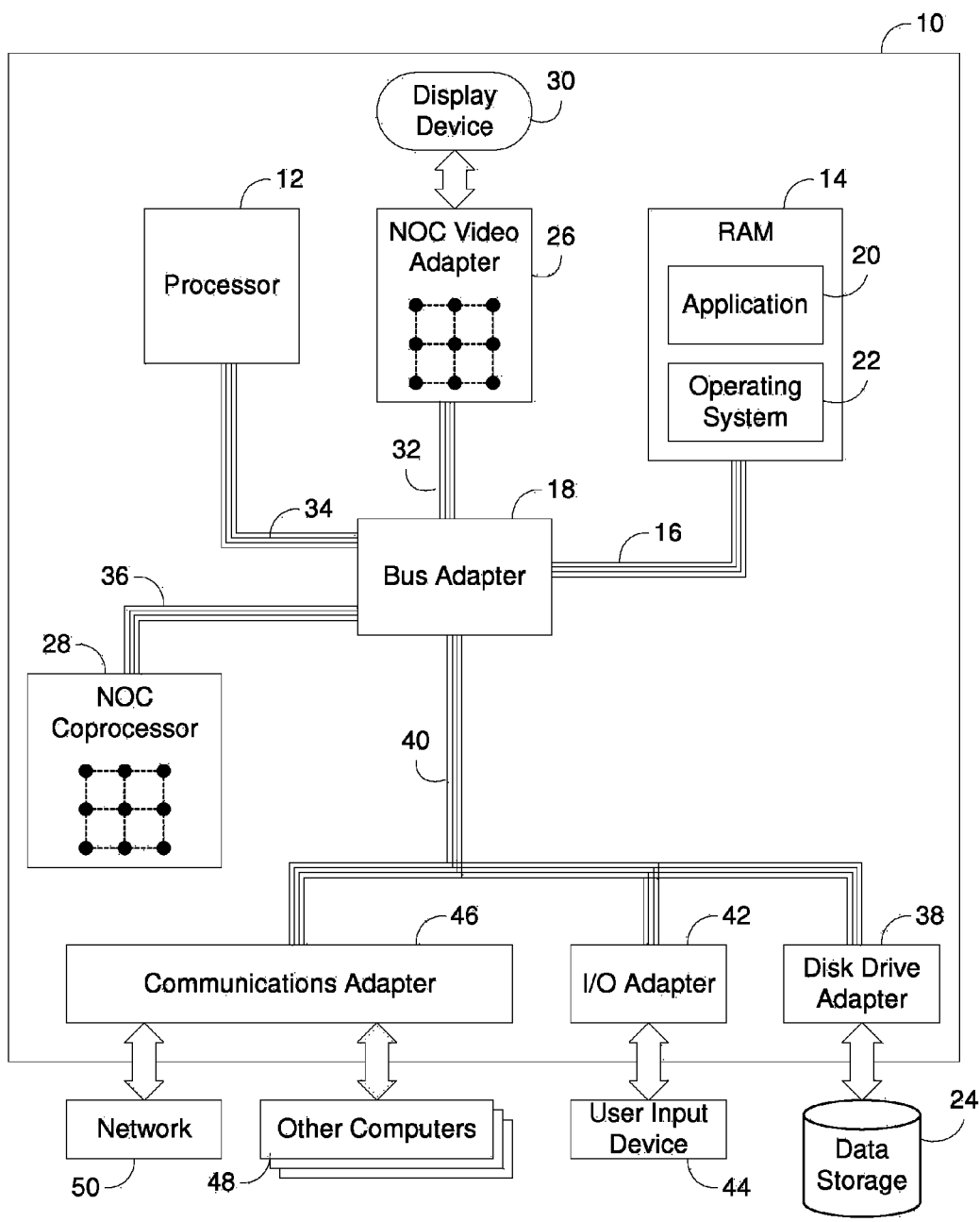
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
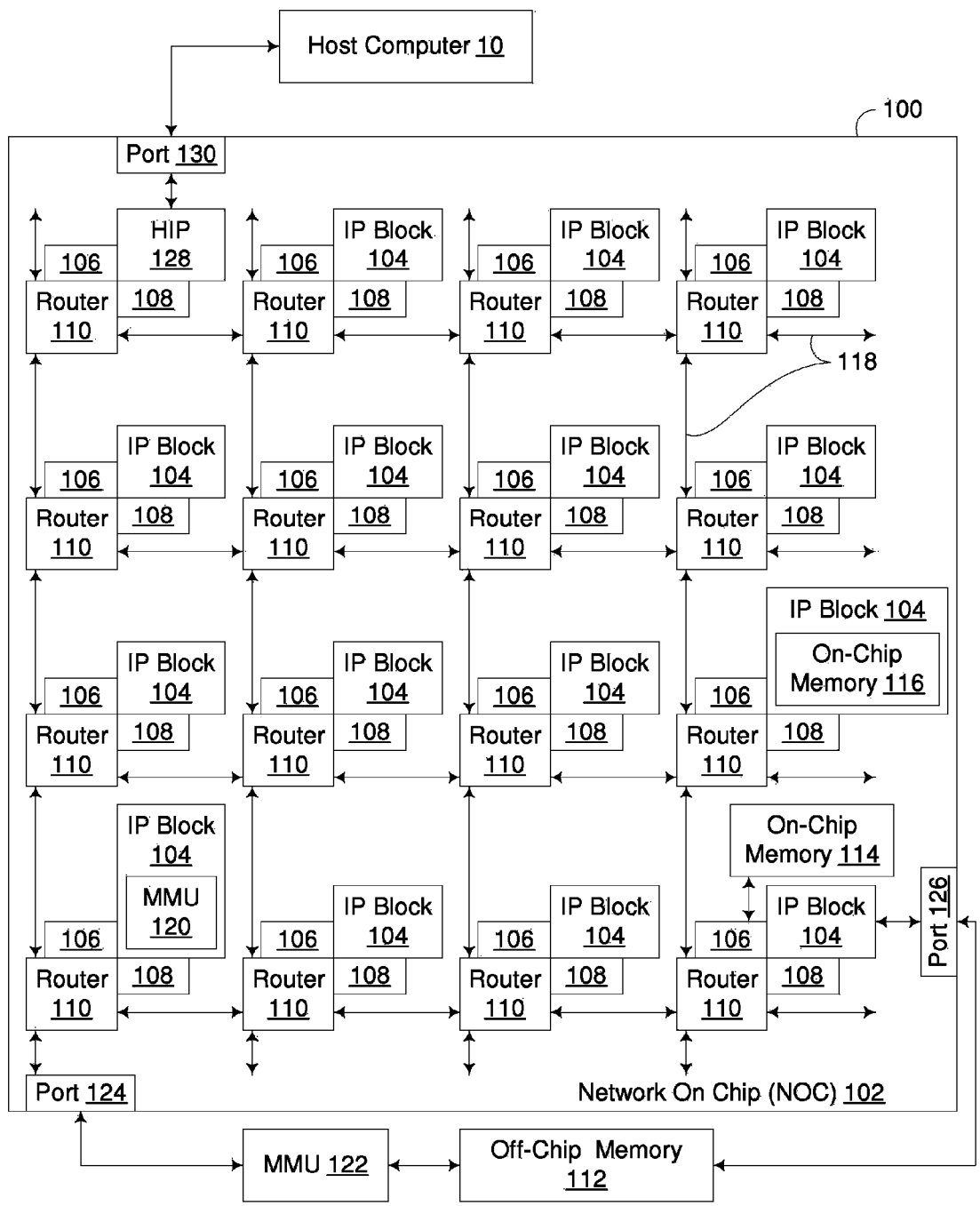
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
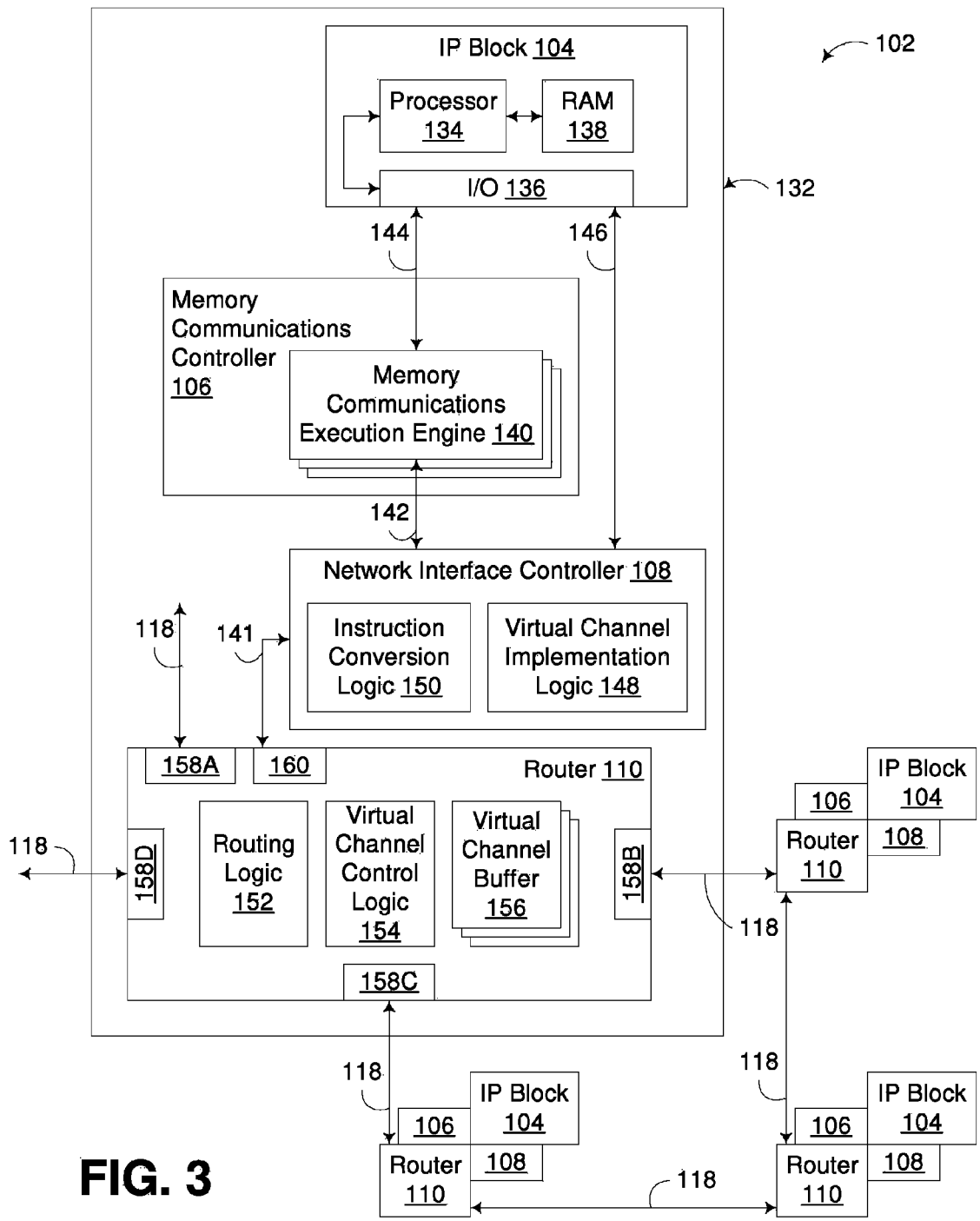
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
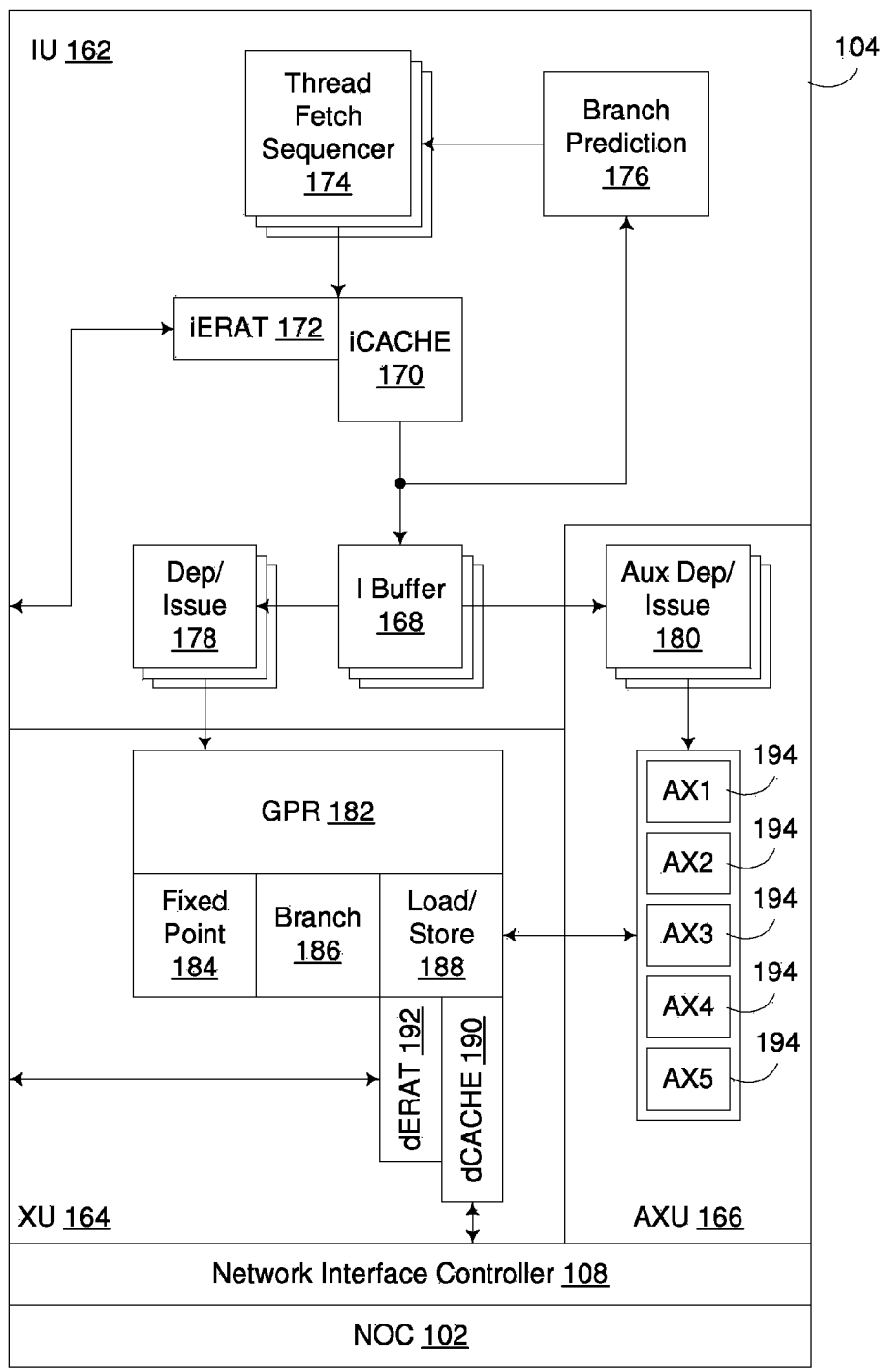
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Vectorizable Execution Unit

Figure 5:
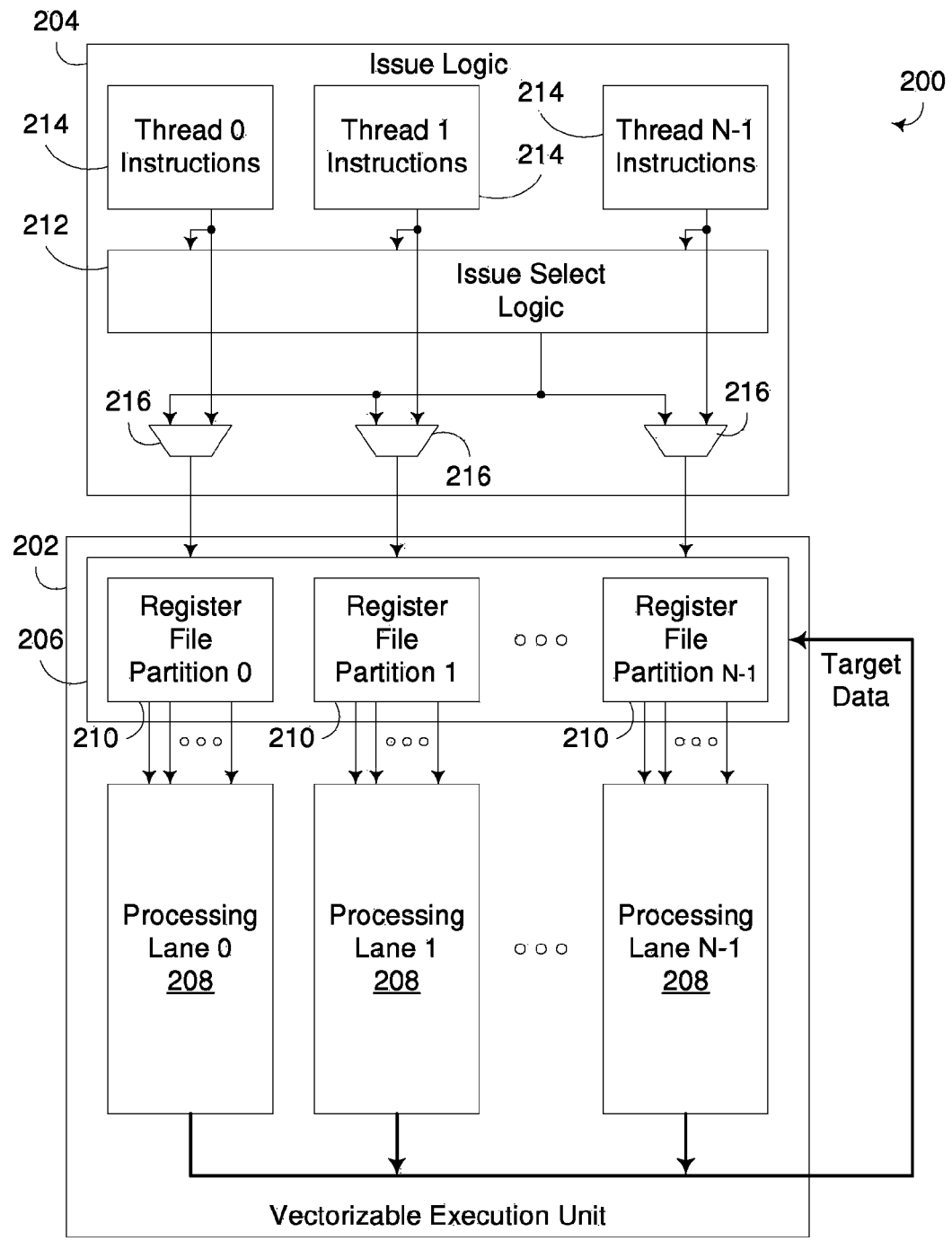
FIG. 5 is a block diagram of a vectorizable execution unit consistent with the invention, and capable of being implemented within an IP block from the NOC of FIG. 2.

Turning now to FIG. 5, this figure illustrates an exemplary processing unit 200 incorporating a vectorizable execution unit 202 consistent with the invention. Processing unit 200 may be implemented, for example, in an IP block such as an IP block 104 from FIGS. 1-4. In the alternative, processing unit 200 may be implemented in other processor architectures that issue and execute instructions, including single or multi-core microprocessors or microcontrollers.

Vectorizable execution unit 202 processes instructions issued to the execution unit by issue logic 204, and includes a register file 206 coupled to a plurality of (N) processing lanes or sub-units 208 capable of processing data stored in register file 206 based upon the instructions issued by issue logic 204, and storing target data back to the register file. Vectorizable execution unit 202 may be implemented as a number of different types of execution units, e.g., floating point units, fixed point units, or specialized execution units such as graphics processing units, encryption/decryption units, coprocessors, XML processing units, etc., for which vector-based processing may be required or desirable.

In general, vectorizable execution unit 202 enables at least two different modes of operation, where in at least one of the modes multiple processing lanes 208 operate together in a single instruction multiple data (SIMD) mode to operate on vectorized data stored in register file 206. Vectorizable execution unit 202 in effect is capable of being configured to define any number of logical execution units, with each constituting one or more of the processing lanes 208.

In one implementation, for example, vector and scalar modes may be defined, such that, in a vector mode, the N processing lanes 208 are functionally joined to one another to operate as a single logical execution unit configured as a vector execution unit, and in a scalar mode, each of the N processing lanes 208 are functionally separate to operate as independent logical execution units, with each logical execution unit configured as a scalar execution units. However, it will be appreciated that this architecture is flexible enough to account for any number of processing lanes, any number of modes, and any grouping of processing lanes into logical execution units. As but one example, an execution unit with four (N=4) processing lanes could support various modes, e.g., where all processing lanes are functionally combined into a single logical execution unit to process 4 word vectors, where three processing lanes are functionally combined into a first logical execution unit to process 3 word vectors and the fourth processing lane operates in parallel as a second logical execution unit configured as an independent scalar unit, where the four processing lanes are combined to form two independent logical execution units configured as vector units each capable of processing 2 word vectors in parallel, where two processing lanes are combined to form a 2 word vector logical execution unit and the remaining two processing units operate in parallel as independent scalar logical execution units, where the four processing lanes are configured to operate in parallel as independent scalar logical execution units, etc. In addition, while it is desirable in the illustrated embodiments to incorporate at least one mode where scalar instruction execution is supported, it will be appreciated that a vectorizable execution unit consistent with the invention may support vector-only modes exclusively, where processing lanes are combined in different manners in different modes to form different vector-based logical execution units (e.g., a first mode with two 2 word vector logical execution units and a second mode with one 4 word vector logical execution unit).

Register file 206 is configured to support different modes of operation through partitioning of the register file into N partitions 210. In the illustrated embodiment, each partition 210 is dedicated to a particular processing lane such that when the processing lane operates in a scalar mode, the registers in the associated partition are dedicated to that partition, and thus free from contention issues with other processing lanes. When processing lanes are functionally combined to operate as a vector unit, the partitions associated with those processing lanes are likewise functionally combined to store vectorized data. In addition, as will become more apparent below, the combined partitions may still be partitioned to allocate portions of the register file to specific threads. In other embodiments, however, other manners of partitioning a register file to allocate portions thereof to different processing lanes may be used.

Issue logic 204 in processing unit 200 functions as control logic and includes issue select logic 212 that is capable of issuing instructions from a plurality of threads, illustrated at 214. Issue select logic 212 operates to schedule the issuance of instructions by the various threads, and typically includes logic for managing dependencies between instructions, in a manner generally understood in the art. When operating in a mode where all processing lanes 208 are grouped into a single vector logical execution unit, issue select logic 212 operates as a single issue unit and sequentially issues SIMD instructions from each thread to the execution unit using any of a number of known scheduling algorithms, and addressing dependency issues in any of a number of manners known in the art.

In order to support a scalar mode of operation, it is desirable to effectively bypass issue select logic 212. To do so, issue logic 204 may also include a set of multiplexers 216 that multiplex between instructions issued by issue select logic 212 and instructions output directly by each thread 214. As such, in the illustrated embodiment, N threads are supported, such that, if desirable, each thread may be allocated its own dedicated processing lane 208. However, in other embodiments, the number of threads need not correspond to the number of processing lanes 208 supported by execution unit 202.

Thus, when operating in a mode where all processing lanes 208 are grouped into a single vector logical execution unit, multiplexers 216 are configured to route instructions from issue select logic 212 to the vectorizable execution unit 202. On the other hand, when operating in a scalar mode, where each processing lane is an independent logical execution unit and dedicated to an associated thread, multiplexers 216 are configured to route instructions from each thread 214 directly to the associated processing lane 208, thus effectively bypassing issue select logic 212.

It will be appreciated that in order to support other modes, e.g., where the processing lanes are grouped into multiple independent vector-based logical execution units, or where independent vector and scalar units are concurrently supported, issue select logic 212 may be configured to support multiple instruction issue per processing cycle. In addition, different multiplexing logic may be substituted for multiplexers 216 to ensure that multiple instructions may be issued in parallel to the different logical execution units configured for vectorizable execution unit 202. The implementation and configuration of issue select and multiplexing logic to implement concurrent issuance of multiple instructions to accommodate multiple modes of operation for vectorizable execution unit 202 would be within the abilities of one of ordinary skill in the art having the benefit of the instant disclosure.

In order to switch modes in processing unit 202, a number of mechanisms may be used. For example, a mode switch may be initiated by writing to a general purpose register or a special purpose register architected into processing unit 200. In the alternative, an instruction stream could be monitored for instructions or instruction streams that may be better suited for one mode or another, so that the mode of the vectorizable execution unit is automatically changed for optimal execution of such instructions. In connection with a mode switch, it will typically be desirable to flush the register file prior to issuing new instructions after the mode switch, although in some embodiments at least portions of the register file may be retained, e.g., if the mode switch does not affect the registers in a particular partition. The flushing of a register file may be supported as a manual operation, or in the alternative, may be automatically performed in response to a mode switch.

Figure 6:
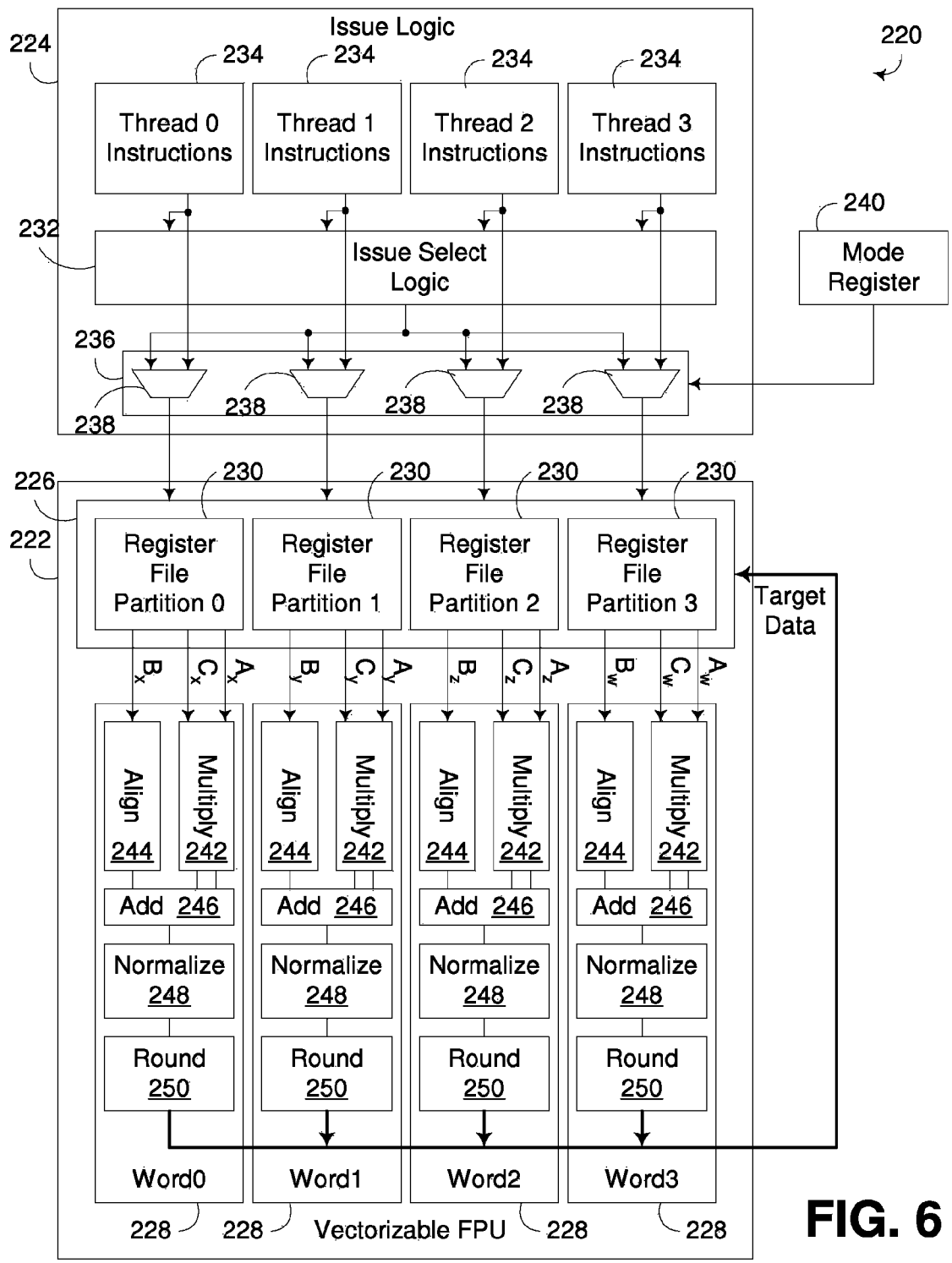
FIG. 6 is a block diagram of an alternate implementation of a vectorizable execution unit to that of FIG. 5, implementing a vectorizable floating point execution unit.

FIG. 6 next illustrates another implementation of a processing unit, processing unit 220, which is specifically architected as a vectorizable floating point unit used for image processing, and capable of operating in vector or scalar modes. In contrast with conventional designs, which traditionally have required architects to choose between large parallel SIMD structures and small scalar structures in very early stages of development, a single structure, adapter for both vector and scalar operations, is provided to enable software designers to configure the unit during runtime to maximize throughput for a given code stream. Processing unit 220 supports two modes. The first, a vector mode, provides a highly threaded 4-way SIMD execution unit, where four threads issue into one SIMD logical execution unit. Issue logic selects between each of the four threads, issuing a vector instruction per cycle. Such a mode is typically well suited for vectorizable code containing many dependent instructions. The second, a scalar mode, operates as four separate scalar logical execution units, with one thread allocated to each logical execution unit. Each thread issues into its respective scalar unit, for a total issue bandwidth of 4 floating point scalar instructions per cycle. Such a mode is typically well suited for code that is not easily vectorizable, and that contains few dependencies.

Specifically, processing unit 220 includes a vectorizable floating point execution unit 222 that processes instructions issued to the execution unit by issue logic 224, and includes a register file 226 coupled to four processing lanes or sub-units 228 capable of processing vectors including up to four words of data stored in register file 226 based upon the instructions issued by issue logic 224, and storing target data back to the register file. Register file 226 is configured to support different modes of operation through partitioning of the register file into four partitions 230. Issue logic 224 in processing unit 220 functions as control logic and includes issue select logic 232 that is capable of issuing instructions from four threads, illustrated at 234.

Issue select logic 232 operates to schedule the issuance of instructions by the various threads, and typically includes logic for managing dependencies between instructions, in a manner generally understood in the art. When operating in a mode where all processing lanes 228 are grouped into a single vector logical execution unit, issue select logic 232 operates as a single issue unit and sequentially issues SIMD instructions from each thread to the execution unit using any of a number of known scheduling algorithms, and addressing dependency issues in any of a number of manners known in the art. In order to support a scalar mode of operation, multiplexing logic 236 is interposed between issue select logic 232 and vectorizable floating point execution unit 222, and includes a set of multiplexers 238 that multiplex between instructions issued by issue select logic 232 and instructions output directly by each thread 234. Thus, when operating in a mode where all processing lanes 228 are grouped into a single vector logical execution unit, multiplexers 238 are configured to route instructions from issue select logic 232 to the vectorizable floating point execution unit 222. On the other hand, when operating in a scalar mode, where each processing lane is an independent logical execution unit and dedicated to an associated thread, multiplexers 238 are configured to route instructions from each thread 234 directly to the associated processing lane 228, thus effectively bypassing issue select logic 232. It will be appreciated that even when operating in scalar mode, however, dependencies are still calculated and addressed.

In processing unit 220, a special purpose register 240, referred to as a mode register, is coupled to multiplexing logic 236 to control the mode of the vectorizable floating point execution unit. Given the implementation includes two modes, the mode register may be implemented using a single bit, or as a single bit in a multi-purpose special purpose register.

Given the configuration of processing unit 220 as a floating point unit usable in image processing applications, each processing lane 228 is configured to process floating point instructions. While a wide variety of other floating point architectures may be used in the alternative, processing unit 220 includes a pipelined floating point execution architecture capable of operating on three vector operands, denoted A, B and C. For vector operations, four word vectors are supported, with the words in each vector being denoted as X, Y, Z and W (e.g., where X, Y, Z, and W refer to the coordinates of a vertex), and as such, each processing lane 228 receives three operand words, one from each vector. Thus, for example, for the processing lane 228 that processes the X word from each vector, the operands fed to that processing lane are denoted as $A_X$, $B_X$ and $C_X$.

Each processing lane 228 is configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

Each processing lane 228 is also pipelined to further improve performance. Accordingly, each processing lane 228 includes a plurality of pipeline stages for performing one or more operations on the operands. For example, for a first stage, each processing lane may include a multiplier 242 for multiplying the A and C operands. In one embodiment of the invention, the multiplication of operands may be performed in a first stage of the pipeline as illustrated in FIG. 6.

Each processing lane 228 may also include an aligner 244 for aligning operand B with the product computed by multiplier 242, in parallel with the computation of the product. While alignment is shown in the same pipeline stage in FIG. 6, one skilled in the art will recognize that the multiplication and alignment may be performed in separate pipeline stages in other embodiments.

Each processing lane 228 may also include an adder 246 for adding two or more operands. In one embodiment (illustrated in FIG. 6), each adder 246 is configured to receive the product computed by multiplier 242 (output as a sum and carry), and add the product to the aligned operand output by aligner 244. Therefore, each processing lane 228 may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane 228 may also include a normalizing stage, and a rounding stage, as illustrated in FIG. 6. Accordingly, a normalizer 248 may be provided in each processing lane. Normalizer 248 may be configured to represent a computed value in a convenient exponential format. For example, normalizer 248 may receive the value 0.0000063 as a result of an operation. Normalizer 248 may convert the value into a more suitable exponential format, for example, 6.3×10-6. The rounding stage may incorporate a router 250 that is capable of rounding a computed value to a desired number of decimal points. For example, a computed value of 10.5682349 may be rounded to 10.568 if only three decimal places are desired in the result. In one embodiment of the invention rounder 250 may round the least significant bits of the particular precision floating point number the rounder is designed to work with.

One skilled in the art will recognize that embodiments of the invention are not limited to the particular pipeline stages, components, and arrangement of components described above and in FIG. 6. For example, in some embodiments, aligner 244 may be configured to align operand B, a product computed by multiplier 242, or both. Furthermore, embodiments of the invention are not limited to the particular components described in FIG. 6. Any combination of the illustrated components and additional components such as, but not limited to, leading zero adders, dividers, etc., may be included in each processing lane 228 consistent with the invention.

Figure 7:
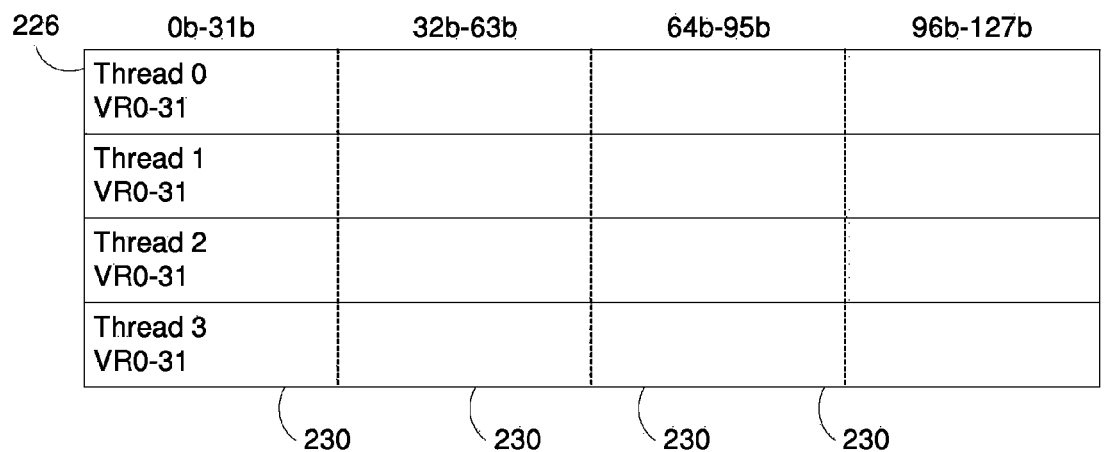
FIG. 7 is a block diagram of the register file in the vectorizable floating point execution unit of FIG. 6 when operating in an SIMD mode.

It will also be appreciated that a number of different register file architectures may be used consistent with the invention. For example, register file 226 may be implemented with 512 32b words, providing either a total of 128 quadword (128b) vector registers or a total of 512 32b word scalar registers. For example, FIG. 7 illustrates an implementation of register file 226 when processing unit 220 is configured in vector or SIMD mode. In this mode, the register file includes 128b (quadword) vectors, with each thread allocated a total of 32 registers (identified as registers VR0-31). It can be seen in FIG. 7 that for each vector, the partitions 230 contribute respective 32b words to the vector, e.g., bits 0b-31b, bits 32b-63b, bits 64b-95b and bits 96b-127b.

Figure 8:
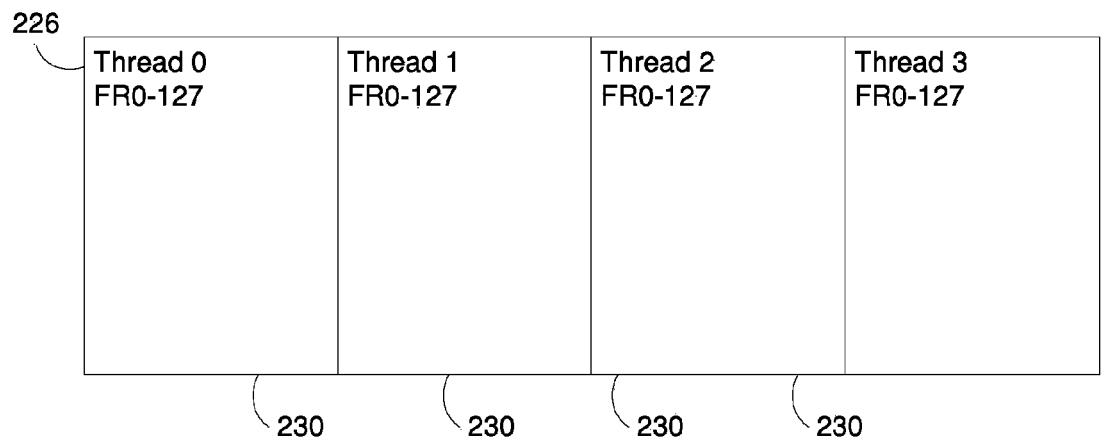
FIG. 8 is a block diagram of the register file in the vectorizable floating point execution unit of FIG. 6 when operating in a scalar mode.

FIG. 8, on the other hand, illustrates an implementation of register file 226 when processing unit 220 is configured in scalar mode. In this mode, the register file includes 32b registers, with each thread allocated a total of 128 registers (identified as registers FR0-127), with the partition 230 associated with each thread providing the 32b storage locations for that thread.

Of note, since the same storage area is used in both configurations, a greater number of registers are supported in scalar mode. In other words, since each register is now ¼th the width, there are 4 times more registers per thread. The additional register entries in this mode may be useful in some embodiments, e.g., for loop un-rolling and prefetching, typically increasing performance by hiding memory latency.

It will be appreciated that, when in the vector mode, vectorizable floating point unit 222 provides a highly threaded SIMD architecture. In addition, when in scalar mode, with the multiplexing logic 236 bypassing issue select logic 232, all four threads are allowed to issue simultaneously. As a result, with this configurable threaded vectorizable floating point unit, software can optimize the hardware to achieve optimal performance for different types of code. In many embodiments, software can reconfigure "on the fly", simply by quiescing all threads, and changing a mode bit. Consequently, in a given software application, the vectorizable floating point unit may be configured to process SIMD instructions, then dynamically switched to a scalar mode to process scalar instructions after the mode switch occurs, as well as vice versa. An application developer is therefore not as constrained by the hardware when attempting to optimize high performance code.

Various modifications may be made without departing from the spirit and scope of the invention. Therefore, the invention lies in the claims hereinafter appended.

What is claimed is:

1. A circuit arrangement, comprising:
a vectorizable floating point unit including a plurality of processing lanes;
control logic coupled to the vectorizable floating point unit and configured to selectively operate the vectorizable floating point unit in vector and scalar modes, wherein in the vector mode, the control logic is configured to operate the plurality of processing lanes collectively as a single instruction multiple data (SIMD) execution unit, and in the scalar mode, the control logic is configured to operate the plurality of processing lanes as separate scalar execution units; and
a register file coupled to the vectorizable floating point unit, wherein in the vector mode, the register file is partitioned into a first plurality of registers, and in the scalar mode, the register file is partitioned into a second plurality of registers that is different from the first plurality of registers, and wherein the control logic is configured to cause the register file to be flushed in response to a mode switch between the vector and scalar modes.

2. A circuit arrangement, comprising:
a vectorizable execution unit including a plurality of processing lanes, wherein the plurality of processing lanes includes at least first and second processing lanes;
control logic coupled to the vectorizable execution unit and configured to selectively operate the vectorizable execution unit in first and second modes, wherein in the first mode, the control logic is configured to organize the first and second processing lanes into the same logical execution unit such that the first and second processing lanes operate collectively as a vector execution unit, and in the second mode, the control logic is configured to organize the first and second processing lanes into separate logical execution units such that the first and second processing lanes operate independently and in parallel with one another; and
a register file coupled to the vectorizable execution unit, wherein in the first mode, the register file is partitioned into a first plurality of registers, and in the second mode, the register file is partitioned into a second plurality of registers that is different from the first plurality of registers, and wherein the control logic is configured to cause the register file to be flushed in response to a mode switch between the first and second modes.

3. The circuit arrangement of claim 2, wherein the control logic is configured to, in the second mode, operate the first and second processing lanes as separate scalar execution units.

4. The circuit arrangement of claim 3, wherein the plurality of processing lanes further includes third and fourth processing lanes, wherein the control logic is configured to, in the first mode, organize the first, second, third and fourth processing lanes into the same logical execution unit such that the first, second, third and fourth processing lanes operate collectively as a vector execution unit, and in the second mode, organize the first and third processing lanes into a first logical execution unit and organize the second and fourth processing lanes into a second logical execution unit that is different from the first logical execution unit such that the first and second logical execution units operate as independent and parallel vector execution units.

5. The circuit arrangement of claim 2, wherein the control logic includes issue logic configured to receive instructions from a plurality of threads, the issue logic configured to, in the first mode, issue a single instruction multiple data (SIMD) instruction to the vectorizable execution unit for collective processing by the first and second processing lanes.

6. The circuit arrangement of claim 5, wherein the issue logic is further configured to, in the second mode, issue first and second instructions in parallel to the vectorizable execution unit for independent and parallel execution by the first and second processing lanes.

7. The circuit arrangement of claim 6, wherein the plurality of threads includes first and second threads, and wherein the issue logic further includes:
issue select logic configured to schedule issuance of instructions from the first and second threads; and
multiplexing logic coupled to the issue select logic and configured to, in the first mode, route instructions issued by the issue select logic to the vectorizable execution unit for collective processing by the first and second processing lanes, and in the second mode, bypass the issue select logic such that instructions received from the first thread are routed to the first processing lane and instructions from the second thread are routed to the second processing lane for parallel execution of instructions from the first and second threads in the first and second processing lanes, respectively.

8. The circuit arrangement of claim 2, further comprising a mode register configured to be written to by software to switch between the first and second modes.

9. The circuit arrangement of claim 2, wherein the control logic is further configured to selectively operate the vectorizable execution unit in a third mode that organizes the first and second processing lanes into different logical execution units from the logical execution units defined in the first and second modes.

10. The circuit arrangement of claim 2, wherein the plurality of processing lanes further includes third and fourth processing lanes, wherein the control logic includes issue logic configured to receive instructions from first, second, third and fourth threads, wherein the first, second, third and fourth processing lanes are respectively associated with the first, second, third and fourth threads, wherein the issue logic is configured to, in the first mode, schedule issuance of single instruction multiple data (SIMD) instructions received from the first, second, third and fourth threads to the vectorizable execution unit for collective processing by the first, second, third and fourth processing lanes, and in the second mode, route scalar instructions from the first, second, third and fourth threads to the associated first, second, third and fourth processing lanes for parallel execution of the scalar instructions by the first, second, third and fourth processing lanes, and wherein the circuit arrangement further comprises a register file coupled to the vectorizable execution unit, wherein in the first mode, the register file is partitioned into four word registers, and in the second mode, the register file is partitioned into single word registers.

11. An integrated circuit device including the circuit arrangement of claim 1.

12. A program product comprising a non-transitory computer readable medium and logic definition program code resident on the computer readable medium and defining the circuit arrangement of claim 1, wherein the logic definition program code is configured for use in the fabrication of an integrated circuit device.

13. A method of operating a vectorizable execution unit, the method comprising:
operating the vectorizable execution unit in a first mode such that first and second processing lanes among a plurality of processing lanes in the vectorizable execution unit are organized into the same logical execution unit and operate collectively as a vector execution unit;
switching the vectorizable execution unit from the first mode to a second mode after operating the vectorizable execution unit in the first mode;
after switching the vectorizable execution unit from the first mode to the second mode, operating the vectorizable execution unit in the second mode such that the first and second processing lanes are organized into separate logical execution units and operate independently and in parallel with one another;
in association with switching from the first mode to the second mode, repartitioning a register file in the vectorizable execution unit from a first plurality of registers associated with the first mode to a second plurality of registers that is associated with the second mode and that is different from the first plurality of registers; and
flushing the register file in response to switching from the first mode to the second mode.

14. The method of claim 13, further comprising, when the vectorizable execution unit is in the second mode, operating the first and second processing lanes as separate scalar execution units.

15. The method of claim 14, wherein the plurality of processing lanes further includes third and fourth processing lanes, wherein operating the vectorizable execution unit in the first mode includes organizing the first, second, third and fourth processing lanes into the same logical execution unit such that the first, second, third and fourth processing lanes operate collectively as a vector execution unit, and wherein operating the vectorizable execution unit in the second mode includes organizing the first and third processing lanes into a first logical execution unit and organizing the second and fourth processing lanes into a second logical execution unit that is different from the first logical execution unit such that the first and second logical execution units operate as independent and parallel vector execution units.

16. The method of claim 13, further comprising:
receiving instructions from a plurality of threads; and
in the first mode, issuing a single instruction multiple data (SIMD) instruction received from one of the plurality of threads to the vectorizable execution unit for collective processing by the first and second processing lanes.

17. The method of claim 16, further comprising, in the second mode, issuing first and second instructions in parallel to the vectorizable execution unit for independent and parallel execution by the first and second processing lanes.

18. The method of claim 17, wherein the plurality of threads includes first and second threads, the method further comprising:
using issue select logic to schedule issuance of instructions from the first and second threads; and
selectively bypassing the issue select logic using multiplexing logic such that in the first mode, instructions issued by the issue select logic are routed to the vectorizable execution unit for collective processing by the first and second processing lanes, and in the second mode, the issue select logic is bypassed such that instructions received from the first thread are routed to the first processing lane and instructions from the second thread are routed to the second processing lane for parallel execution of instructions from the first and second threads in the first and second processing lanes, respectively.

19. The method of claim 13, wherein switching from the first mode to the second mode is performed responsive to a value written to a mode register by software.

20. The method of claim 13, further comprising selectively operating the vectorizable execution unit in a third mode that organizes the first and second processing lanes into different logical execution units from the logical execution units defined in the first and second modes.

21. The method of claim 13, wherein the plurality of processing lanes further includes third and fourth processing lanes, the method further comprising:
receiving instructions from a plurality of threads including first, second, third and fourth threads that are respectively associated with the first, second, third and fourth processing lanes;
in the first mode, scheduling issuance of single instruction multiple data (SIMD) instructions received from the first, second, third and fourth threads to the vectorizable execution unit for collective processing by the first, second, third and fourth processing lanes;
in the second mode, routing scalar instructions from the first, second, third and fourth threads to the associated first, second, third and fourth processing lanes for parallel execution of the scalar instructions by the first, second, third and fourth processing lanes.

* * * * *